US006764256B2

(12) United States Patent
Miura

(10) Patent No.: US 6,764,256 B2
(45) Date of Patent: Jul. 20, 2004

(54) ANGLE DRILLS HAVING ROTARY HANDLES

(75) Inventor: Masahiko Miura, Anjo (JP)

(73) Assignee: Makita Corporation, Anjo (JP)

(*) Notice: Subject to any disclaimer, the term of this patent is extended or adjusted under 35 U.S.C. 154(b) by 0 days.

(21) Appl. No.: 10/179,028

(22) Filed: Jun. 26, 2002

(65) Prior Publication Data

US 2003/0002937 A1 Jan. 2, 2003

(30) Foreign Application Priority Data

Jun. 27, 2001 (JP) ....................................... 2001-195282

(51) Int. Cl.[7] ................................................ B23B 45/00
(52) U.S. Cl. ....................... 408/124; 16/430; 408/241 R
(58) Field of Search ............................. 408/241 R, 124; 16/426, 430, 900; 173/39

(56) References Cited

U.S. PATENT DOCUMENTS

| | | | | | |
|---|---|---|---|---|---|
| 4,136,579 | A | * | 1/1979 | Robinson et al. | 408/241 R |
| 5,201,146 | A | | 4/1993 | Fushiya | |
| 5,339,572 | A | * | 8/1994 | Eicher | 451/358 |
| 5,407,381 | A | * | 4/1995 | Schaefer et al. | 451/358 |
| 5,466,183 | A | * | 11/1995 | Kirn et al. | 451/359 |
| 5,681,214 | A | * | 10/1997 | Kleider et al. | 451/358 |
| 5,697,158 | A | * | 12/1997 | Klinzing et al. | 30/166.3 |
| 6,108,867 | A | * | 8/2000 | Nagashima | 16/110.1 |
| 6,293,859 | B1 | * | 9/2001 | Fink et al. | 451/344 |

* cited by examiner

*Primary Examiner*—Daniel W. Howell
(74) *Attorney, Agent, or Firm*—Dennison, Schultz, Dougherty & MacDonald

(57) ABSTRACT

An angle drill includes a housing that accommodates a motor. The angle drill also includes a handle that is adapted to be held by an operator during a drilling operation. The handle is coupled to the housing such that the handle can rotate relative to the housing.

10 Claims, 4 Drawing Sheets

ANGLE DRILLS HAVING ROTARY HANDLES

This application claims priority to Japanese patent application number 2001-195282 filed Jun. 27, 2001, the contents of which are hereby incorporated herein by reference.

BACKGROUND OF THE INVENTION

1. Technical Field

The present invention relates to angle drills that have a housing and a handle adapted to be held by an operator.

2. Description of the Related Art

Angle drills are known that have a tubular motor housing and a gear housing. A motor is disposed within the motor housing. A spindle is rotatably supported within the gear housing and extends in a direction perpendicular to the output shaft of the motor. The rotational torque of the motor is transmitted to the spindle via a bevel gear. A drill bit may be mounted on the spindle, so that the drill bit rotates when the motor is started.

A handle is mounted on the rear portion of the motor housing and has the same axis as the longitudinal axis of the motor housing. A switch lever is mounted on the handle for starting and stopping the motor. A grip is attached to the motor housing. Therefore, the operator can perform a drilling operation by operating the switch lever while he or she holds the handle and the grip with both hands.

However, in the known angle drills, the axis of the spindle is fixed relative to the handle. Therefore, if the angle drill is used to be operated within a narrow space or is used to be operated with the spindle oriented toward a desired direction, it is difficult in some cases for the operator to properly hold the handle and operate the switch lever. Therefore, the known angle drills have a problem in operability.

U.S. Pat. No. 5,201,146 in the name of the same assignee as the present application teaches a disk grinder that has a motor housing and a handle that is rotatably coupled to the motor housing at a joint portion. The handle can be fixed in position in the rotational direction by means of a bolt that extends through the joint portion. In order to change the rotational position of the handle, the operator loosens the bolt and rotates the handle to a desired position. Then, the bolt is tightened to fixed the handle relative to the motor housing.

SUMMARY OF THE INVENTION

Therefore, it is one object of the present teachings to provide improved angle drills. For example, in one aspect of the present teachings, angle drills may have a housing that accommodates a motor. A handle may be rotatably coupled to the housing and may be adapted to be held by an operator. Therefore, the rotational position of the handle can be changed in response to various operating conditions, e.g. places of use of the angle drills and postures of the angle drills during the operation, so that the operator can properly hold the handle during the drilling operation.

According to another aspect of the present teachings, a lock device is operable to selectively lock and unlock the handle relative to the housing with regard to the rotational direction. Therefore, the operator can lock the handle in the desired position and can unlock the handle to rotate the handle to another rotational position without need of any additional tools.

According to another aspect of the present teachings, the lock device may includes a lock button and a plurality of engaging recesses. The lock button may be mounted on one of the housing and the handle and the engaging recesses formed in the other of the housing and the handle. The engaging recesses may be spaced from each other in the rotational direction, so that the lock button can engage either one of the engaging recesses for locking the handle with regard to the rotation. Therefore, the handle can be reliably locked at plural positions through engagement of the lock button with the engaging recesses. In addition, the locking and unlocking operations can be easily performed by simply moving the lock button.

Preferably, the lock button may be mounted on the handle and the engaging recesses may be formed in the housing. The lock button may be disposed adjacent to a switch lever that also may be mounted on the handle for starting and stopping the motor. The lock button and the switch lever may be positioned such that the operator can operate the lock button and the switch lever while he or she holds the handle.

Additional objects, features and advantages of the present invention will be readily understood after reading the following detailed description together with the accompanying drawings and the claims.

DETAILED DESCRIPTION OF THE INVENTION

Figure 1:
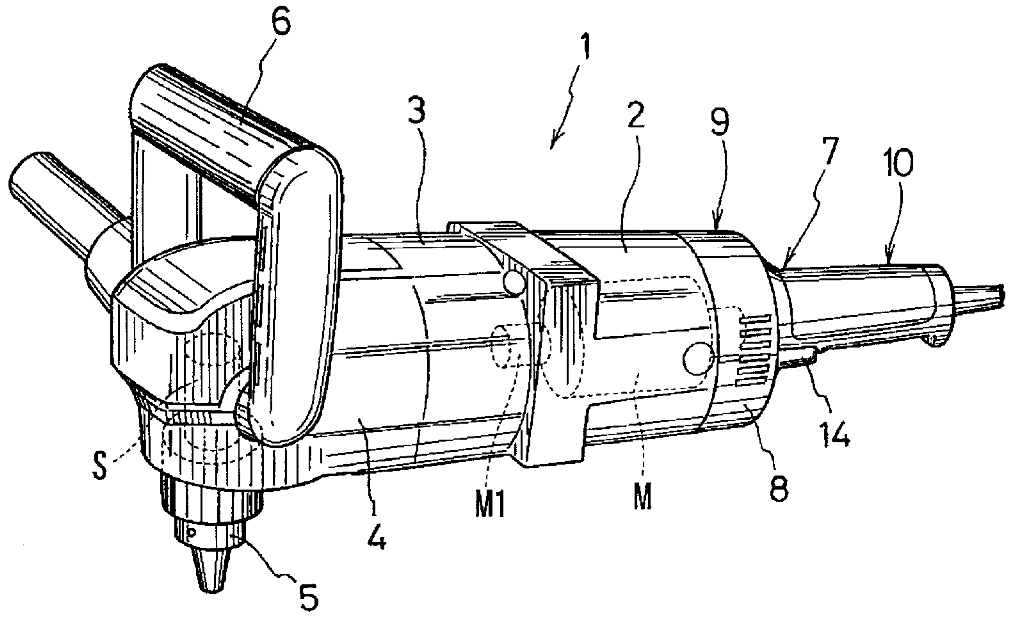
FIG. 1 is a perspective view of a representative angle drill.

In one embodiment of the present teachings, angle drills may include a tubular motor housing and a tubular handle. A spindle may be mounted within the housing and may be coupled to the motor, so that the spindle can be rotatably driven by the motor. A chuck may be mounted on the spindle and a drill bit may be removably mounted on the chuck. The handle may be coupled to the motor housing, so that the handle can rotate about the same axis as the longitudinal axis of the motor housing, which axis may be substantially perpendicular to the axis of the spindle. Therefore, the handle can be rotated to a desired rotational position relative to the motor housing.

In another embodiment of the present teachings, a switch lever may be mounted on a rear portion of the handle and a lock device may be disposed between the motor housing and the handle. The lock device may prevent and permit the rotation of the handle relative to the motor housing. Therefore, the handle can be fixed in a desired rotational position without using additional tools.

In another embodiment of the present teachings, the lock device may include a lock button and a plurality of engaging portions. The lock button can engage either one of the engaging portions. For example, the engaging portions may be engaging recesses formed in the motor housing and the lock button may be pivotally mounted on the handle.

In another embodiment of the present teachings, the lock button may be disposed adjacent to the switch lever and may have an end portion biased by a spring toward inside of the handle. Preferably, the lock button may be pivotally mounted on the housing about an axis that is substantially perpendicular to the rotational axis of the handle.

In another embodiment of the present teachings, the engaging portions may be arranged along a moving path of the end portion of the lock button during the rotation of the handle relative to the motor housing. The end portion of the lock button may engage the engaging portions, so that the handle can be reliably locked in the rotational direction by selectively engaging the end portion of the lock button with one of the engaging portions. Therefore, the locking operation of the handle can be performed by simply pressing the lock button so as to engage the lock button with the corresponding engaging portion. On the other hand, the unlocking operation can be performed by simply releasing the lock button. Therefore, the locking and unlocking operations can be easily performed.

In another embodiment of the present teachings, the handle may be rotatably coupled to the housing by means of a coupling device that includes an annular recess formed in the handle and an annular projection formed on the housing. The annular recess and the annular projection may engage with each other such that the handle is prevented from moving in the axial direction along the rotational axis and to permit rotation of the handle relative to the housing.

In another embodiment of the present teachings, the annular projection may be interrupted at plural positions in the circumferential direction, so that the engaging portions are defined at the interrupted positions, respectively.

Each of the additional features and teachings disclosed above and below may be utilized separately or in conjunction with other features and teachings to provide improved angle drills and methods for designing and using such angle drills. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 2:
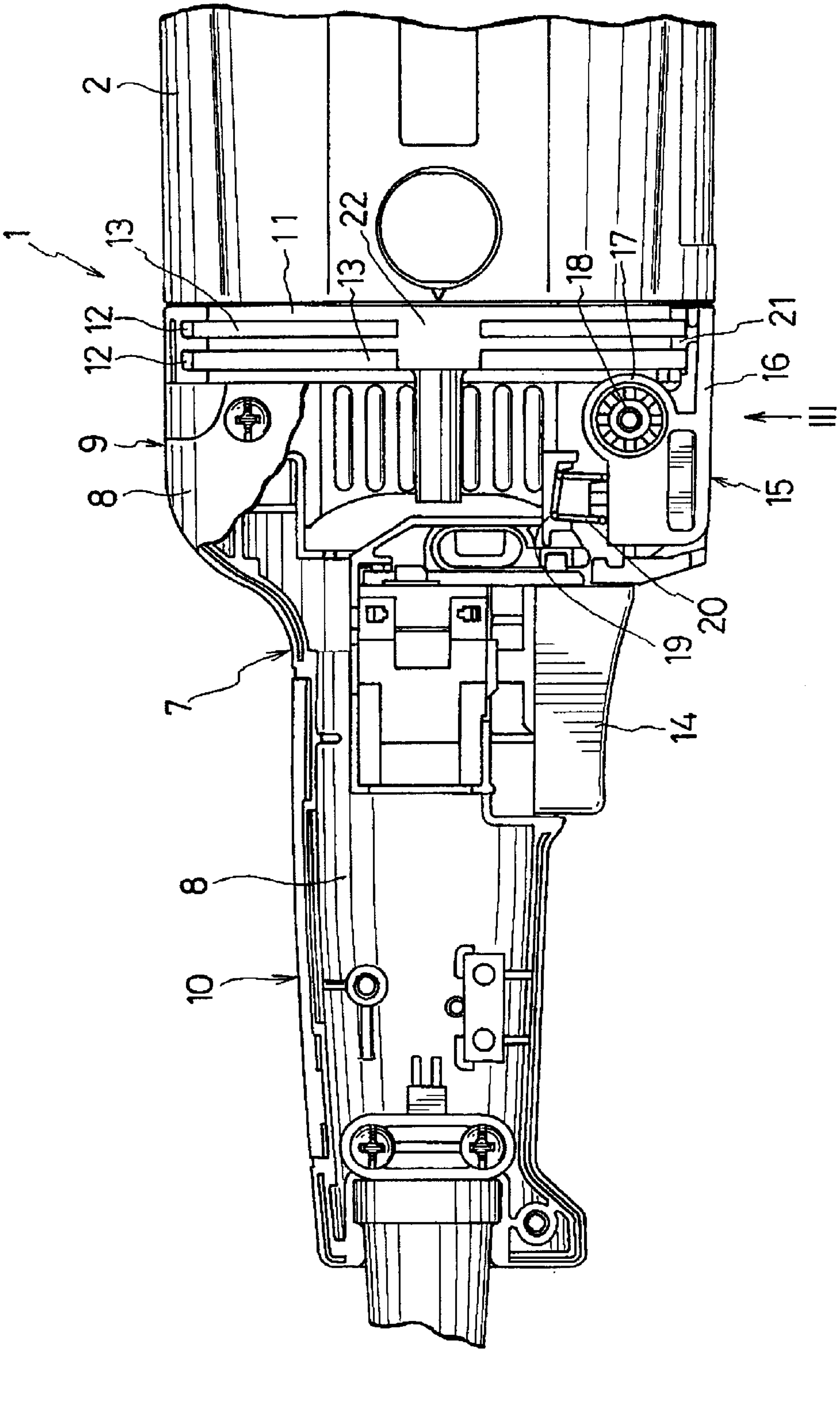
FIG. 2 is a broken away sectional view of a handle and a part of a motor housing of the representative angle drill.

A representative angle drill 1 will now be described with reference to the drawings. Referring to FIGS. 1 and 2, the angle drill 1 may have a housing that includes a tubular motor housing 2, a gear housing 3 and a front housing 4. A motor M may be disposed within the motor housing 2 and may have an output shaft M1 that has the same axis as the longitudinal axis of the motor housing 2. The gear housing 3 and the front housing 4 may be attached to the front end (left end as viewed in FIG. 1) of the motor housing 2 and may cooperate with each other to define a space for accommodating various parts and mechanisms that are associated with the motor M. For example, a speed-reduction mechanism (not shown) may be disposed within the gear housing 3 and a bevel gear (not shown) may be disposed within the gear housing 3.

A spindle S may be rotatably supported within the front housing 4 and may extend in a direction substantially perpendicular to the output shaft M1 of the motor M. The bevel gear may be interposed between an output shaft (not shown) of the speed-reduction mechanism and the spindle S. Therefore, the rotational torque of the output shaft M1 of the motor M may be transmitted to the reduction mechanism and then to the spindle S via the bevel gear. A chuck 5 may be attached to the spindle S, so that a drill bit (not shown) can be removably mounted to the spindle S by means of the chuck 5. A grip 6 may be attached to the front upper portion of the front housing 4.

A tubular handle 7 may be coupled to the motor housing 2 and may include a pair of handle halves 8 that are separated by a dividing surface. Preferably, the dividing surface may extend within a plane that is parallel to the longitudinal axis of the motor housing 2 or the output shaft M1 of the motor M. The handle halves 8 may be assembled together to form a joint portion 9 and a handle portion 10. The joint portion 9 may be adapted to be coupled to the rear end of the motor housing 2. The outer surface of the joint portion 9 may extends in substantially continuity with the outer surface of the motor housing 2. The handle portion 10 may extend rearward from the joint portion 9 and may have a smaller diameter than the diameter of the joint portion 9. More specifically, the motor housing 2 may have a rear end 11 that has an outer diameter that is smaller than the outer diameter of the remaining portion of the motor housing 2.

In order to couple the handle portion 10 to the motor housing 2, the handle halves 8 may be fitted onto the rear end 11 in such a manner that the rear end 11 is surrounded by the front portions of the handle halves 8, which front portions may form the joint portion 9. The handle halves 8 may then be tightened to each other by means of screws (not shown). In addition, a pair of parallel recesses 12 may be formed in the inner wall of the front portion of each of the handle halves 8 and may extend along a circle about the axis of the handle portion 10, which axis is the same as the longitudinal axis of the motor housing 2 and the output shaft M1 of the motor M. The parallel recesses 12 may extend throughout the length in the circumferential direction of each of the handle halves 8. On the other hand, a pair of parallel projections 13 may be formed on the outer surface of the rear end 11 of the motor housing 2 along a circle about the axis of the motor housing 2. The parallel projection 13 may engage the corresponding parallel recesses 12 that arc formed in the joint portion 9, i.e., the front portions of the handle halves 8.

Therefore, when the joint portion 9 of the handle portion 10 is coupled to the rear end 11 of the motor housing 2, the handle 7 may be prevented from moving in the axial direction relative to the motor housing 2 due to engagement between the parallel recesses 12 and the parallel projections 13. However, in the coupled state, the parallel projections 13 may loosely engage the corresponding parallel recesses 12, so that the handle 7 can rotate relative to the motor housing 2 about the same axis as the motor housing 2, i.e., the output shaft M1 of the motor M.

Referring to FIGS. 1 and 2, a spring-biased switch lever 14 may be supported between the handle halves 8 at the handle portion 10 of the handle 7. The switch lever 14 may be electrically connected to the motor M via electric wires (not shown), so that the motor can be started and stopped when the switch lever 14 is pushed and released by the operator, respectively.

Figure 3:
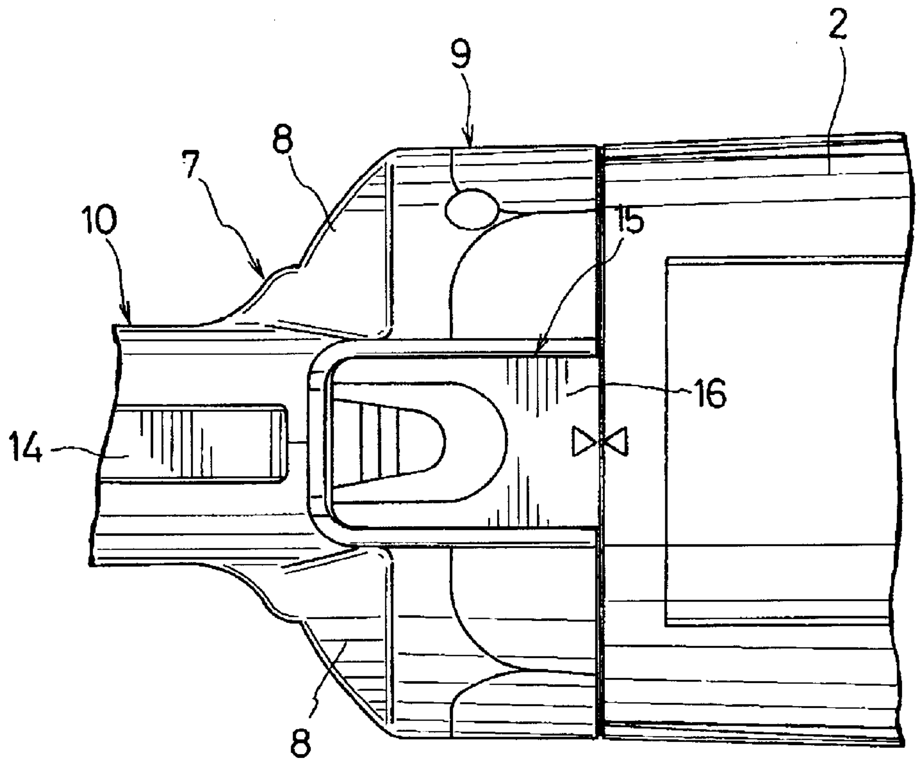
FIG. 3 is a view as viewed in a direction of arrow III in FIG. 2.

Referring to FIGS. 2 and 3, a lock button 15 may be mounted on the handle 7 in a position adjacent to and forwardly of the switch lever 14. The lock button 15 may be received within a substantially rectangular opening that is formed in the joint portion 9 of the handle 7 in a position between the handle halves 8. The opening may have an open front end and a closed rear end.

Preferably, the lock button 15 may have a button member 16 and a tubular support shaft 17. The button member 16 may have a rectangular configuration that conforms to the configuration of the opening in the joint portion 9. An outer surface of the button member 16 may be exposed to the outside through the opening as shown in FIG. 3. The support shaft 17 may be formed integrally with the inner portion of the button member 16 in a substantially middle position of the button member 16 with respect to the forward and rearward directions (right and left directions as viewed in FIG. 2). The support shaft 17 may extend in a direction substantially perpendicular to the axis of the joint portion 9, i.e. the axis of the output shaft M1 of the motor M or the axis of the handle 7.

A boss portion 18 may extend between the handle halves 8 across the opening that receives the lock button 15 and may be slidably inserted into the support shaft 17, so that the lock button 15 can pivot about the boss portion 18. Preferably, the boss portion 18 may be configured to receive one of the screws that are adapted to tighten the handle halves 8. A compression coil spring 20 may be interposed between the rear portion (left portion as viewed in FIG. 2) of the button member 16 and a rib 19 that is disposed inside of the joint portion 9. Preferably, the rib 19 may be constituted by rib halves that are formed on the respective handle halves 8. Therefore, the lock button 15 may be biased in a counterclockwise direction as viewed in FIG. 2. The front portion (right portion as viewed in FIG. 2) of the button member 16 may extend forwardly over the rear end 11 of the motor housing 2 and may have an engaging portion 21 that is formed inside of the front portion.

Figure 4:
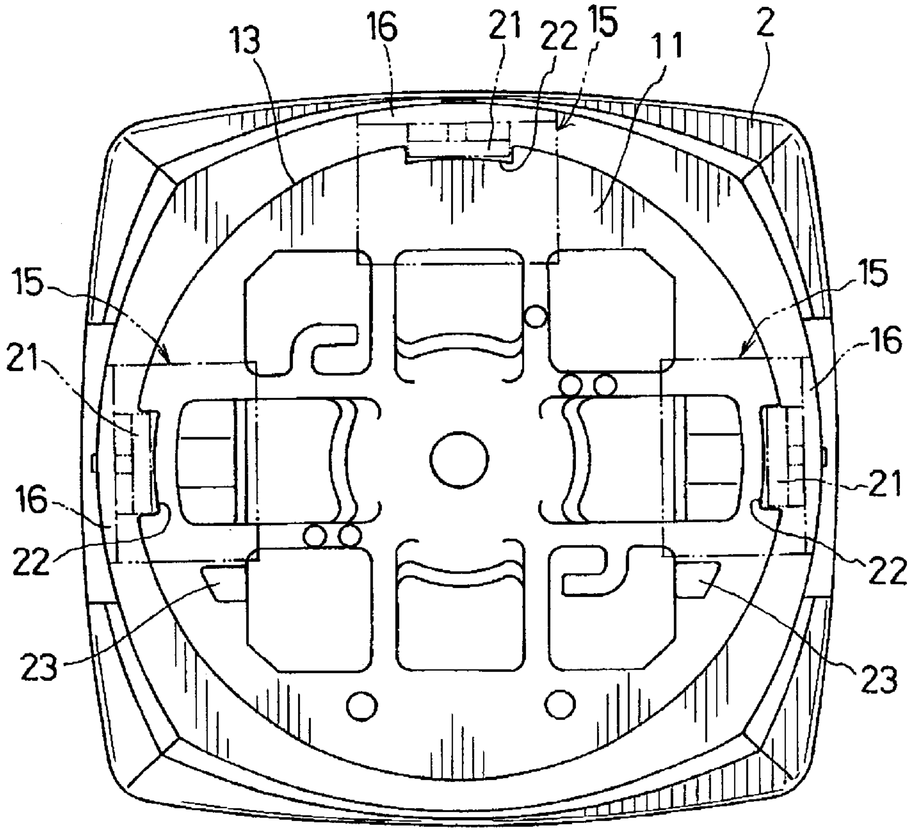
FIG. 4 is a rear view of the motor housing.

Referring to FIGS. 2 and 4, the parallel projections 13 of the rear end 11 of the motor housing 2 may be interrupted at three positions to define engaging recesses 22 that are spaced from each other in the circumferential direction. Preferably, the central engaging recess 22 may be displaced by an angle of 90° relative to each of the left and right engaging recesses 22 as viewed in FIG. 4. Preferably, the width of the engaging recesses 22 in the circumferential direction may be determined to be substantially equal to the width of the engaging portion 21, so that the engaging portion 21 can engage either one of the engaging recesses 22. Thus, the engaging recesses 22 may be positioned on a moving path of the engaging portion 21 when the handle 7 rotates relative to the motor housing 2.

When the engaging portion 21 engages either one of the engaging recesses 22, the lock button 15 may be prevented from moving in the circumferential direction relative to the rear end 11 of the motor housing 2. In addition, the engaging portion 21 may contact the bottom of the corresponding engaging recess 22, i.e. the outer surface of the rear end 11 by the biasing force of the coil spring 20. In this engaging position, the outer surface of the button member 16 may extend substantially flash with the outer surface of the joint portion 9. When, the operator presses the button member 16 of the lock button 15 toward inside of the joint portion 9 against the biasing force of the coil spring 20, the lock button 15 may pivot about the support shaft 17. Then, the front portion of the button member 16 may move away from the corresponding engaging recess 22 to the outside beyond the parallel projections 13.

Preferably, as shown in FIG. 4, a pair of stoppers 23 may be secured to the end surface of the rear end 11 of the motor housing 2 and may be positioned inwardly of the right and left engaging recesses 22. Preferably, the stoppers 23 may be disposed adjacent to the right and left engaging recesses 22 in the circumferential direction, respectively. Therefore, the stoppers 23 may oppose to or contact the lock button 15 when the engaging member 16 of the lock button 15 engages the right and left engaging recesses 22. As a result, the rotational angle of the handle housing 7 may be limited substantially within an angle of 180°

The operation of the representative angle drill 1 will now be described. When the engaging member 21 of the lock button 15 engages the central engaging recess 22 of the rear end 11 of the motor housing 2 as shown in FIG. 2, the lock button 15 may be prevented from moving in the circumferential direction relative to the motor housing 2 due to contact with the circumferential ends of the parallel projections 13. The lock button 15 is mounted on the handle 7 such that the lock button 15 cannot move in the circumferential direction relative to the handle 7. Therefore, the handle 7 may be prevented from rotating in the circumferential direction. As a result, the handle 7 may be fixed in position relative to the motor housing 2 in the rotational direction.

In order to change the rotational position of the handle 7, the operator may press the rear portion of the lock button 15 toward inside of the joint portion 9. Therefore, the engaging member 21 of the button member 16 may be disengaged from the central engaging recess 22 and the button member 16 may not oppose to the circumferential ends of the parallel projections 13. The operator may then rotate the handle 7 relative to the motor housing 2 in right or left directions as viewed in FIG. 2.

When the handle housing 7 has rotated by an angle of 90°, the operator may release the pressing force applied to the lock button 15, so that the engaging member 21 of the button member 16 may engage the right or left engaging recess 22 with the aid of the biasing force of the coil spring 20. Consequently, the handle 7 can be locked in a right side or left side rotational position that is displaced from the original position by an angle of 90°. Otherwise, the operator may release the pressing force applied to the lock button 15 after the handle 7 has rotated by a small angle from the original position. In such a case, the engaging member 21 of the lock button 15 may contact the outer edges of the parallel projections 13. As the handle 7 further rotates, the engaging member 21 may slide along the outer edges of the parallel projections 13 and may automatically engage the left or right engaging recess 22 when the handle 7 has rotated by an angle of 90°.

Therefore, according to the representative angle drill 1, the rotational position of the handle housing 7 relative to the motor housing 2 can be selectively fixed at three different positions. In addition, the rotational position of the handle 7 can be changed by the steps of pressing the lock button 15, rotating the handle 7 and thereafter releasing the lock button 15 at an appropriate rotational position. Thus, according to the representative angle drill, the rotational position of the handle 7 can be changed without using any tools, e.g. spanners and wrenches, which will require troublesome or time-consuming operations. In addition, the handle 7 can be locked by a simple operation at an appropriate rotational position in response to the operating condition, so that the operability can be improved.

Although the rotary range of the handle 7 relative to the motor housing 2 is limited to 180° in the above representative embodiment, the rotary range may be set to a different angular range. For example, the rotary range may be more than 180° as long as the wiring of the electric lines (that extend from the switch lever 14 within the handle 7 to the motor M) is not affected. In addition, four or more number of the engaging recesses 22 may be provided and may be spaced from each other by an angle other than 90°. For example, the engaging recesses 22 may be spaced from each other by an angle that is smaller than 90°, so that the operator may have broad options with regard to settable rational angles. Therefore, the operability may be further improved.

In addition, although the lock member 16 of the lock button 15 of the above representative embodiment pivots about the boss 18 that extends perpendicular to the longitudinal axis of the handle housing 2, the lock member 16 may pivot about an axis that is parallel to the longitudinal axis of the handle housing 2 as long as the engaging member 21 of the lock member 16 can engage with and disengage from the engaging recesses 22.

What is claimed is:

1. An angle drill comprising:

a housing arranged and constructed to accommodate a motor;

a handle arranged and constructed to be held by an operator, wherein the handle includes handle halves;

a coupling device arranged and constructed to couple the handle to the housing, so that the handle can rotate relative to the housing; and a lock device arranged and constructed to selectively lock and unlock the handle relative to the housing with regard to the rotational direction, wherein the lock device includes a lock button and a support shaft that supports that lock button, the support shaft is rotatably mounted to a boss portion extending across the handle halves, and the boss portion is arranged and constructed to receive screws thereon for tightening the handle halves.

2. An angle drill comprising:

a tubular motor housing having an axis;

a handle coupled to the motor housing, so that the handle can rotate about the same axis as the axis of the motor housing; wherein the handle includes handle halves;

a switch lever mounted on a rear portion of the handle; and a lock device disposed between the motor housing and the handle and arranged and constructed to prevent and permit the rotation of the handle relative to the motor housing;

the lock device including a lock button, a plurality of engaging portions, and a support shaft, wherein the support shaft is rotatably mounted to a boss portion extending across the handle halves, the boss portion is arranged and constructed to receive screws for tightening the handle halves;

the lock button being disposed in a position adjacent to the switch lever and having an end portion biased toward inside of the handle;

the engaging portions being provided on the motor housing and arranged along a moving path of the end portion of the lock button during the rotation of the handle relative to the motor housing;

the end portion of the lock button being engageable with the engaging portions, so that the handle can be locked in a position in the rotational direction by selectively engaging the end portion of the lock button with one of the engaging portions.

3. An angle drill as in claim 1, wherein the lock device can lock the handle at a plurality of lock positions that are displaced from each other in the rotational direction.

4. An angle drill as in claim 3, wherein the lock button is mounted on one of the housing and the handle and a plurality of engaging recesses formed in the other of the housing and the handle, the engaging recesses, being spaced from each other in the rotational direction, so that the lock button can engage either one of the engaging recesses for locking the handle with regard to the rotation.

5. An angle drill as in claim 4, wherein the boss portion extends along an axis that is substantially perpendicular to the rotational axis of the handle.

6. An angle drill as in claim 5, further including a biasing member that biases the lock button in a direction toward the engaging recesses.

7. An angle drill as in claim 4, wherein the coupling device includes an annular recess formed in one of the housing and the handle and an annular projection formed on the other of the housing and the handle, the annular recess and the annular projection engaging with each other so as to prevent the handle from moving in an axial direction along the rotational axis and to permit rotation of the handle relative to the housing.

8. An angle drill as in claim 7, wherein the annular projection is interrupted at plural positions in the circumferential direction so as to define the engaging recesses at the interrupted positions, respectively.

9. An angle drill as in claim 1, further including a spindle mounted within the housing and coupled to the motor, so that the spindle is rotatably driven by the motor, the spindle having a spindle axis that extends substantially perpendicular to the rotational axis of the housing.

10. An angle drill as in claim 9, further including a chuck mounted on the spindle, the chuck being arranged and constructed to removably hold a drill bit.

* * * * *